United States Patent
Subramanian et al.

(10) Patent No.: US 10,921,890 B2
(45) Date of Patent: Feb. 16, 2021

(54) METHOD AND APPARATUS FOR PROVIDING TACTILE SENSATIONS

(71) Applicant: ULTRAHAPTICS IP LTD, Bristol (GB)

(72) Inventors: Sriram Subramanian, Hove (GB); Thomas Andrew Carter, Bristol (GB); Benjamin John Oliver Long, Bristol (GB)

(73) Assignee: Ultrahaptics IP Ltd, Bristol (GB)

(*) Notice: Subject to any disclaimer, the term of this patent is extended or adjusted under 35 U.S.C. 154(b) by 0 days.

(21) Appl. No.: 15/897,804

(22) Filed: Feb. 15, 2018

(65) Prior Publication Data

US 2018/0181203 A1    Jun. 28, 2018

Related U.S. Application Data

(63) Continuation of application No. 15/432,289, filed on Feb. 14, 2017, now Pat. No. 9,898,089, which is a continuation of application No. 14/149,518, filed on Jan. 7, 2014, now Pat. No. 9,612,658.

(51) Int. Cl.
 *G06F 3/01* (2006.01)
 *G01C 21/36* (2006.01)

(52) U.S. Cl.
 CPC ......... *G06F 3/016* (2013.01); *G01C 21/3652* (2013.01); *G06F 3/011* (2013.01)

(58) Field of Classification Search
 CPC ...... G06F 3/016; G06F 3/011; G01C 21/3652
 See application file for complete search history.

(56) References Cited

U.S. PATENT DOCUMENTS

| | | | |
|---|---|---|---|
| 4,218,921 A | 8/1980 | Oran et al. |
| 4,771,205 A | 9/1988 | Mequio |
| 4,881,212 A | 11/1989 | Takeuchi |
| 5,329,682 A | 7/1994 | Thurn |

(Continued)

FOREIGN PATENT DOCUMENTS

| CN | 102591512 | 7/2012 |
|---|---|---|
| CN | 103797379 | 5/2014 |

(Continued)

OTHER PUBLICATIONS

International Preliminary Report on Patentability for Application No. PCT/EP2017/069569 dated Feb. 5, 2019, 11 pages.

(Continued)

*Primary Examiner* — Sejoon Ahn
(74) *Attorney, Agent, or Firm* — Koffsky Schwalb LLC; Mark I. Koffsky

(57) ABSTRACT

The present disclosure concerns a method and apparatus for the creation of an acoustic field for providing tactile sensations. More particularly, but not exclusively, this disclosure concerns a method and apparatus for the creation of an acoustic field providing tactile sensations for use with an interactive device.

The disclosure provides a method of generating a tactile sensation. The method comprises the steps of providing a plurality of acoustic transducers arranged to generate a predetermined distribution of pressure patterns, wherein the pressure patterns comprise a first region providing a first tactile sensation and a second region providing a second, different, tactile sensation.

8 Claims, 3 Drawing Sheets

(56) References Cited

U.S. PATENT DOCUMENTS

| | | |
|---|---|---|
| 5,426,388 A | 6/1995 | Flora et al. |
| 5,511,296 A | 4/1996 | Dias |
| 6,029,518 A | 2/2000 | Oeftering |
| 6,503,204 B1 | 1/2003 | Sumanaweera et al. |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,109,789 B2 | 9/2006 | Spencer |
| 7,225,404 B1 | 5/2007 | Zilles et al. |
| 7,577,260 B1 | 8/2009 | Hooley |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,607,922 B1 | 12/2013 | Werner |
| 8,833,510 B2 | 9/2014 | Koh |
| 8,884,927 B1 | 11/2014 | Cheatham, III |
| 9,208,664 B1* | 12/2015 | Peters ............ G08B 7/06 |
| 9,612,658 B2 | 4/2017 | Subramanian |
| 9,662,680 B2 | 5/2017 | Yamamoto |
| 9,841,819 B2 | 12/2017 | Carter |
| 9,945,818 B2 | 4/2018 | Ganti |
| 9,977,120 B2 | 5/2018 | Carter et al. |
| 10,101,811 B2 | 10/2018 | Carter |
| 10,101,814 B2 | 10/2018 | Carter |
| 10,140,776 B2* | 11/2018 | Schwarz .......... G06T 19/20 |
| 10,146,353 B1* | 12/2018 | Smith ......... G06F 3/04845 |
| 10,469,973 B2 | 11/2019 | Hayashi |
| 10,569,300 B2 | 2/2020 | Hoshi |
| 2002/0149570 A1* | 10/2002 | Knowles ........ H03K 17/96 345/173 |
| 2003/0024317 A1 | 2/2003 | Miller |
| 2003/0144032 A1 | 7/2003 | Brunner et al. |
| 2003/0182647 A1 | 9/2003 | Radeskog |
| 2004/0014434 A1 | 1/2004 | Haardt |
| 2004/0091119 A1 | 5/2004 | Duraiswami et al. |
| 2004/0226378 A1 | 5/2004 | Oda |
| 2004/0210158 A1 | 10/2004 | Organ |
| 2004/0264707 A1 | 12/2004 | Yang |
| 2005/0052714 A1 | 3/2005 | Klug |
| 2005/0212760 A1 | 9/2005 | Marvit |
| 2006/0085049 A1 | 4/2006 | Cory et al. |
| 2006/0090955 A1 | 5/2006 | Cardas |
| 2006/0091301 A1 | 5/2006 | Trisnadi |
| 2007/0036492 A1 | 2/2007 | Lee |
| 2007/0177681 A1 | 8/2007 | Choi et al. |
| 2007/0263741 A1 | 11/2007 | Erving |
| 2008/0012647 A1 | 1/2008 | Risbo et al. |
| 2008/0084789 A1 | 4/2008 | Altman |
| 2008/0273723 A1 | 11/2008 | Hartung et al. |
| 2008/0300055 A1 | 12/2008 | Lutnick |
| 2009/0093724 A1 | 4/2009 | Pernot et al. |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0030076 A1 | 2/2010 | Vortman |
| 2010/0044120 A1 | 2/2010 | Richter |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0262008 A1 | 10/2010 | Roundhill |
| 2010/0321216 A1 | 12/2010 | Jonsson |
| 2011/0006888 A1 | 1/2011 | Bae |
| 2011/0051554 A1 | 3/2011 | Varray et al. |
| 2011/0199342 A1 | 8/2011 | Vartanian et al. |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1* | 9/2012 | Birnbaum ........ G06F 3/015 345/156 |
| 2012/0229400 A1 | 9/2012 | Birnbaum |
| 2012/0229401 A1 | 9/2012 | Birnbaum et al. |
| 2012/0236689 A1 | 9/2012 | Brown |
| 2012/0299853 A1 | 11/2012 | Dagar |
| 2012/0307649 A1 | 12/2012 | Park et al. |
| 2012/0315605 A1* | 12/2012 | Cho ............... G09B 21/005 434/114 |
| 2013/0035582 A1 | 2/2013 | Radulescu |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0204002 A1 | 7/2014 | Bennet |
| 2014/0265572 A1 | 9/2014 | Siedenburg |
| 2015/0002477 A1* | 1/2015 | Cheatham, III ...... G06F 3/016 345/177 |
| 2015/0006645 A1 | 1/2015 | Oh |
| 2015/0007025 A1 | 1/2015 | Sassi |
| 2015/0066445 A1 | 3/2015 | Lin et al. |
| 2015/0070147 A1 | 3/2015 | Cruz-Hernandez et al. |
| 2015/0070245 A1 | 3/2015 | Han et al. |
| 2015/0078136 A1 | 3/2015 | Sun |
| 2015/0081110 A1 | 3/2015 | Houston |
| 2015/0110310 A1 | 4/2015 | Minnaar |
| 2015/0013023 A1 | 5/2015 | Harris et al. |
| 2015/0130323 A1 | 5/2015 | Harris |
| 2015/0168205 A1* | 6/2015 | Lee ................ G01L 1/26 177/1 |
| 2015/0192995 A1 | 7/2015 | Subramanian et al. |
| 2015/0220199 A1 | 8/2015 | Wang |
| 2015/0226537 A1 | 8/2015 | Schorre |
| 2015/0226831 A1 | 8/2015 | Nakamura et al. |
| 2015/0248787 A1 | 9/2015 | Abovitz |
| 2015/0258431 A1 | 9/2015 | Stafford |
| 2015/0277610 A1 | 10/2015 | Kim |
| 2015/0304789 A1 | 10/2015 | Babyoff |
| 2015/0331576 A1 | 11/2015 | Piya |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen |
| 2016/0124080 A1 | 5/2016 | Carter |
| 2016/0138986 A1 | 5/2016 | Carlin |
| 2016/0189702 A1 | 6/2016 | Blanc et al. |
| 2016/0242724 A1 | 8/2016 | Lavallee |
| 2016/0246374 A1 | 8/2016 | Carter |
| 2016/0249150 A1 | 8/2016 | Carter et al. |
| 2016/0291716 A1 | 10/2016 | Boser |
| 2016/0306423 A1 | 10/2016 | Uttermann |
| 2016/0320843 A1 | 11/2016 | Long |
| 2017/0002839 A1 | 1/2017 | Bukland |
| 2017/0004819 A1 | 1/2017 | Ochiai |
| 2017/0018171 A1 | 1/2017 | Carter |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2018/0039333 A1 | 2/2018 | Carter |
| 2018/0074580 A1 | 3/2018 | Hardee |
| 2018/0081439 A1 | 3/2018 | Daniels |
| 2018/0139557 A1 | 5/2018 | Ochiai |
| 2018/0151035 A1 | 5/2018 | Maalouf |
| 2018/0304310 A1 | 10/2018 | Long |
| 2018/0350339 A1 | 12/2018 | Macours |
| 2018/0361174 A1 | 12/2018 | Radulescu |
| 2019/0038496 A1 | 2/2019 | Levesque |
| 2019/0091565 A1 | 3/2019 | Nelson |
| 2019/0197840 A1 | 6/2019 | Kappus |

(56) References Cited

U.S. PATENT DOCUMENTS

FOREIGN PATENT DOCUMENTS

| | | |
|---|---|---|
| CN | 103984414 A | 8/2014 |
| CN | 107340871 A | 11/2017 |
| EP | 1875081 A1 | 1/2008 |
| EP | 1911530 A1 | 4/2008 |
| EP | 2271129 A1 | 1/2011 |
| EP | 3207817 A1 | 8/2017 |
| GB | 2464117 | 4/2010 |
| GB | 2513884 | 11/2014 |
| GB | 2513884 A | 11/2014 |
| GB | 2530036 | 3/2016 |
| JP | 2010109579 | 5/2010 |
| JP | 2011172074 | 9/2011 |
| JP | 201248378 | 3/2012 |
| JP | 2016035646 | 3/2016 |
| KR | 20120065779 | 6/2012 |
| KR | 20130055972 | 5/2013 |
| KR | 20160008280 | 1/2016 |
| WO | 1991/18486 | 11/1991 |
| WO | 96/39754 | 12/1996 |
| WO | 2005/017965 | 2/2005 |
| WO | 2009071746 A1 | 6/2009 |
| WO | 2010003836 | 1/2010 |
| WO | 2012023864 | 2/2012 |
| WO | 2012104648 A1 | 8/2012 |
| WO | 2013/179179 | 12/2013 |
| WO | 2014181084 | 11/2014 |
| WO | 2014181084 A1 | 11/2014 |
| WO | 2015006467 | 1/2015 |
| WO | 2015/039622 | 3/2015 |
| WO | 2016007920 | 1/2016 |
| WO | 2016132141 A1 | 8/2016 |
| WO | 2016132144 | 8/2016 |
| WO | 2016132144 A1 | 8/2016 |
| WO | 2016137675 | 9/2016 |
| WO | 2016/162058 | 10/2016 |
| WO | 2017172006 | 10/2017 |

OTHER PUBLICATIONS

Japanese Office Action (with English language translation) for Application No. 2017-514569, dated Mar. 31, 3019, 10 pages.
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated May 16, 2019 for U.S. Appl. No. 15/396,851 (pp. 1-7).
Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).
International Preliminary Report on Patentability and Written Opinion issued in corresponding PCT/US2017/035009, dated Dec. 4, 2018, 8 pages.
Notice of Allowance dated Feb. 7, 2019 for U.S. Appl. No. 15/851,214 (pp. 1-7).
Office Action dated Feb. 20, 2019 for U.S. Appl. No. 15/623,516 (pp. 1-8).
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Zeng, Wejun, "Microsoft Kinect Sensor and Its Effect," IEEE Multimedia, Apr.-Jun. 2012, 7 pages.
Kolb, et al., "Time-of-Flight Cameras in Computer Graphics," Computer Graphics forum, vol. 29 (2010), No. 1, pp. 141-159.
Iddan, et al., "3D Imaging in the Studio (And Elsewhwere . . . " Apr. 2001, 3DV systems Ltd., Yokneam, Isreal, www.3dvsystems.com.il, 9 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
"Welcome to Project Soli" video, https://atap.google.com/#project-soli Accessed Nov. 30, 2018, 2 pages.
Sixth Sense webpage, http://www.pranavmistry.com/projects/sixthsense/ Accessed Nov. 30, 2018, 7 pages.
Damn Geeky, "Virtual projection keyboard technology with haptic feedback on palm of your hand," May 30, 2013, 4 pages.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
Pompei, F.J. (2002), "Sound from Ultrasound: The Parametric Array as an Audible Sound Source", Massachusetts Institute of Technology.
Hasegawa, K. and Shinoda, H. (2013) "Aerial Display of Vibrotactile Sensation with High Spatial-Temporal Resolution using Large Aperture Airbourne Ultrasound Phased Array", University of Tokyo.
Hoshi, T. et al. (2010), "Noncontrast Tactile Display Based on Radiation Pressure of Airbourne Ultrasound", IEEE Transactions on Haptics, vol. 3, No. 3.
Yoshino, K. and Shinoda, H. (2013), "Visio Acoustic Screen for Contactless Touch Interface with Tactile Sensation", University of Tokyo.
Kamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.

(56) References Cited

OTHER PUBLICATIONS

Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics (Proceedings of SIGGRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.
Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.

Search report and Written Opinion of ISA for PCT/GB2017/050012 dated Jun. 8, 2017.
Search Report for PCT/GB2017/052332 dated Oct. 10, 2017.
Corrected Notice of Allowability dated Jun. 21, 2019 for U.S. Appl. No. 15/966,213 (2 pages).
International Search Report and Written Opinion for Application No. PCT/GB2018/053739, dated Jun. 4, 2019, 16 pages.
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
A. Sand, Head-Mounted Display with Mid-Air Tactile Feedback, Proceedings of the 21st ACM Symposium on Virtual Reality Software and Technology, Nov. 13-15, 2015.
M. Toda, New Type of Matching Layer for Air-Coupled Ultrasonic Transducers, IEEE Transactions on Ultrasonics, Ferroelectrics, and Frequency Control, vol. 49, No. 7, Jul. 2002.
E. Bok, Metasurface for Water-to-Air Sound Transmission, Physical Review Letters 120, 044302 (2018).
Search Report for PCT/GB/2017/053880 dated Mar. 21, 2018.
Search Report for PCT/GB/2017/053729 dated Mar. 15, 2018.
M. A.B. Andrade, Matrix method for acoustic levitation simulation, IEEE Transactions on Ultrasonics Ferroelectrics and Frequency Control, 58 n. 8 (2011).
M. Barmatz, Acoustic radiation potential on a sphere in plane, cylindrical, and spherical standing wave of fields, J. Acoustical Socirty, 77 No. 3 (1985).
Yang Ling, Phase-coded approach for controllable generation of acoustical vortices, J. Applied Physics 113, No. 15 (2013).
K. Jia, Dynamic properties of micro-particles in ultrasonic transportation using phase-controlled standing waves, J. Applied Physics 116, n. 16 (2014).
Xin Cheng et al., Computation of the Acoustic Radiation Force on a Sphere Based on the 3-D FDTD Method, IEEE Symposium 2010.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Search report for PCT/US2018/028966 dated Jul. 13, 2018 (43 pages).
Search report for PCT/GB2018/051061 dated Sep. 26, 2018 (17 pages).
EPO Office Action for EP16708440.9 dated Sep. 12, 2018 (7 pages).
Ashish Shrivastava et al., Learning from Simulated and Unsupervised Images through Adversarial Training, Jul. 19, 2017, pp. 1-16.
Canada Application 2,909,804 Office Action dated Oct. 18, 2019, 4 pages.
Christoper M. Bishop, Pattern Recognition and Machine Learning, 2006, pp. 1-758.
David Joseph Tan et al., Fits like a Glove: Rapid and Reliable Hand Shape Personalization, 2016 IEEE Conference on Computer Vision and Pattern Recognition, pp. 5610-5619.
Diederik P. Kingma et al., Adam: A Method for Stochastic Optimization, Jan. 30, 2017, pp. 1-15.
Eric Tzeng et al., Adversarial Discriminative Domain Adaptation, Feb. 17, 2017, pp. 1-10.
European Office Action for Application No. EP16750992.6, dated Oct. 2, 2019, 3 pages.
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.

(56) References Cited

OTHER PUBLICATIONS

Hilleges et al. Interactions in the air: adding further depth to interactive tabletops, UIST '09: Proceedings of the 22nd annual ACM symposium on User interface software and technologyOct. 2009 pp. 139-148.
Hua J, Qin H., Haptics-based dynamic implicit solid modeling, IEEE Trans Vis Comput Graph. Sep.-Oct. 2004;10(5):574-86.
International Search Report and Written Opinion for Application No. PCT/GB2018/053738, dated Apr. 11, 2019, 14 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
Jager et al., "Air-Coupled 40-KHZ Ultrasonic 2D-Phased Array Based on a 3D-Printed Waveguide Structure", 2017 IEEE, 4 pages.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Konstantinos Bousmalis et al., Domain Separation Networks, 29th Conference on Neural Information Processing Sysgtems (NIPS 2016), Barcelona, Spain. Aug. 22, 2016, pp. 1-15.
Mahdi Rad et al., Feature Mapping for Learning Fast and Accurate 3D Pose Inference from Synthetic Images, Mar. 26. 2018, pp. 1-14.
Marin, About LibHand, LibHand-A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Apr. 22, 2020 for U.S. Appl. No. 15/671,107 (pp. 1-5).
Notice of Allowance dated Feb. 10, 2020, for U.S. Appl. No. 16/160,862 (pp. 1-9).
Notice of Allowance dated Jun. 17, 2020 for U.S. Appl. No. 15/210,661 (pp. 1-9).
Notice of Allowance in U.S. Appl. No. 15/210,661 dated Jun. 17, 2020 (22 pages).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Dec. 11, 2019 for U.S. Appl. No. 15/959,266 (pp. 1-15).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Mar. 20, 2020 for U.S. Appl. No. 15/210,661 (pp. 1-10).
Office Action dated May 18, 2020 for U.S. Appl. No. 15/960,113 (pp. 1-21).
OGRECave/ogre—GitHub: ogre/Samples/Media/materials at 7de80a7483f20b50f2b10d7ac6de9d9c6c87d364, Mar. 26, 2020, 1 page.
Optimal regularisation for acoustic source reconstruction by inverse methods, Y. Kim, P.A. Nelson, Institute of Sound and Vibration Research, University of Southampton, Southampton, S017 1BJ, UK; 25 pages.
Partial International Search Report for Application No. PCT/GB2018/053735, dated Apr. 12, 2019, 14 pages.
Partial ISR for Application No. PCT/GB2020/050013 dated May 19, 2020 (16 pages).
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report for PCT/GB2015/052507 dated Mar. 11, 2020 (19 pages).
Search report for PCT/GB2015/052916 dated Feb. 26, 2020 (18 pages).
Sergey Ioffe et al., Batch Normalization: Accelerating Deep Network Training by Reducing Internal Covariat Shift, Mar. 2, 2015, pp. 1-11.
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Stan Melax et al., Dynamics Based 3D Skeletal Hand Tracking, May 22, 2017, pp. 1-8.
Takahashi et al., "Noncontact Tactile Display Based on Radiation Pressure of Airborne Ultrasound" IEEE Transactions on Haptics vol. 3, No. 3, p. 165 (2010).
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Vincent Lepetit et al., Model Based Augmentation and Testing of an Annotated Hand Pose Dataset, ResearchGate, https://www.researchgate.net/publication/307910344, Sep. 2016, 13 pages.
Wooh et al., "Optimum beam steering of linear phased arays," Wave Motion 29 (1999) pp. 245-265, 21 pages.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Corrected Notice of Allowability dated Oct. 31, 2019 for U.S. Appl. No. 15/623,516 (pp. 1-2).
Extended European Search Report for Application No. EP19169929.7, dated Aug. 6, 2019, 7 pages.
International Search Report and Written Opinion for Application No. PCT/GB2019/050969, dated Jun. 13, 2019, 15 pages.
Office Action dated Aug. 22, 2019 for U.S. Appl. No. 16/160,862 (pp. 1-5).
Office Action dated Oct. 31, 2019 for U.S. Appl. No. 15/671,107 (pp. 1-6).

(56) References Cited

OTHER PUBLICATIONS

Office Action dated Oct. 7, 2019 for U.S. Appl. No. 15/396,851 (pp. 1-9).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
Imaginary Phone: Learning Imaginary Interfaces by Transferring Spatial Memory From a Familiar Device Sean Gustafson, Christian Holz and Patrick Baudisch. UIST 2011. (10 pages).
ISR and WO for PCT/GB2020/050013 (dated Jul. 13, 2020) (20 pages).
ISR and WO for PCT/GB2020/050926 (dated Jun. 2, 2020) (16 pages).
Large et al., Feel the noise: Mid-air ultrasound haptics as a novel human-vehicle interaction paradigm, Applied Ergonomics (2019) (10 pages).
Mueller, GANerated Hands for Real-Time 3D Hand Tracking from Monocular RGB, Eye in-Painting with Exemplar Generative Adversarial Networks, pp. 49-59 (Jun. 1, 2018).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Rocchesso et al., Accessing and Selecting Menu Items by In-Air Touch, ACM CHItaly'19, Sep. 23-25, 2019, Padova, Italy (9 pages).
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Teixeira, et al., "A brief introduction to Microsoft's Kinect Sensor," Kinect, 26 pages, retrieved Nov. 2018.

\* cited by examiner

METHOD AND APPARATUS FOR PROVIDING TACTILE SENSATIONS

REFERENCE TO RELATED APPLICATION

This application is a continuation of U.S. patent application Ser. No. 15/432,289, filed on Feb. 14, 2017, which is a continuation of U.S. patent application Ser. No. 14/149,518, filed on Jan. 7, 2014, now U.S. Pat. No. 9,612,658.

FIELD

The subject matter described herein concerns a method and apparatus for the creation of an acoustic field for providing tactile sensations. More particularly, but not exclusively, this subject matter concerns a method and apparatus for the creation of an acoustic field providing tactile sensations for use with an interactive device.

BACKGROUND

Various interactive haptic technologies exist, which provide a user or users with tactile information or feedback, often in combination with visual information displayed on an interactive screen. For example, previous haptic feedback devices include pins moving to physically change a deformable surface. A pen connected to an articulated arm may be provided, as in the SensAble PHANTOM device. Alternatively, a user may wear, for example in the form of a glove, one or more actuators which are activated to provide haptic feedback to a user. However, in each of these technologies, a user requires physical contact with a deformable surface, a pen, or a specially adapted glove. Such requirements reduce the usability and spontaneity which with a user may interact with a system.

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximise the acoustic radiation force exerted.

However, existing ultrasound haptic devices do not allow for the provision of distinctive multiple localised feedback points in mid-air. A user is not able to distinguish between such multiple localised feedback points if they are separated only by a small distance. Therefore, there is also a limit to the resolution of the haptic feedback devices which in turn limits how useful such devices can be.

Examples of when a high resolution haptic feedback device could be useful include when a user cannot properly see a display because they are driving, or when a user does not wish to touch a display because they have dirty hands. It would be advantageous to be able to provide user feedback above such a surface in order to allow information to be transmitted via an additional, haptic, channel in parallel with or as an alternative to the visual display.

The subject matter described herein seeks to mitigate the above-mentioned problems.

SUMMARY

According to a first aspect of the subject matter described herein, there is provided a method of generating a tactile sensation comprising the steps of:

providing a plurality of acoustic transducers arranged to generate a predetermined distribution of pressure patterns, wherein the pressure patterns comprise a first region providing a first tactile sensation and a second region providing a second, different, tactile sensation.

That the first tactile sensation feels different from the second tactile sensation allows a user to distinguish between the first region and second region. Advantageously, a user being able to distinguish between the first region and second region enables each region to be allocated an individual meaning. For example, if the method is used to generate tactile sensations in relation to an interactive control device such as a music player control device, the first region may represent one control element and the second region may represent a second, different, control element, for example a play/pause control element and a volume control element respectively. The method provides a user with distinct tactile sensations without requiring the user to wear or use any special equipment.

The first tactile sensation and the second tactile sensation may be provided simultaneously.

The acoustic transducers may be ultrasound transducers. The ultrasound transducers may be arranged to emit ultrasound at a frequency of 40 kHz.

The first region may comprise a focal point for a plurality of acoustic waves modulated at a first frequency, and the second region may comprise a focal point for a plurality of acoustic waves modulated at a second, different frequency. The acoustic waves may be modulated at a frequency between 0 Hz and half of the carrier frequency. The carrier frequency may be 40 kHz. The acoustic waves may be modulated at a frequency from 0.1 Hz to 500 Hz, and in some cases between 150 Hz and 250 Hz. Advantageously, modulating the acoustic waves at a frequency from 0.1 Hz to 500 Hz provides haptic feedback at the optimum frequencies for detection by human skin, as the tactile receptors in skin are more sensitive to changes in skin deformation at these frequencies.

The first region may comprise a high pressure sub-region and a low pressure sub-region. The second region may comprise a high pressure sub-region and a low pressure sub-region. The provision of high pressure sub-regions and low pressure sub-regions may increase the perceived difference between the first tactile sensation and second tactile sensation.

The method may be used to provide haptic feedback in association with an interactive surface. An interactive surface may be a display screen with direct interaction capability. For example, a user may interact with the display screen through touch or touchless interaction. For example, the first region and second region may provide feedback points for a user of an interactive surface. The provision of a first tactile sensation and a second, different, tactile sensation allows meaning to be attributed to the first and second tactile sensations.

The method may comprise each of the plurality of acoustic transducers contributing to the first region and second region simultaneously.

The method may comprise providing an interactive screen, the first and second tactile sensation being created in close proximity to the screen, for example within a few centimetres of the screen, for example within 5 cm of the screen, within 3 cm of the screen or within 1 cm of the screen. The first and second tactile sensation may be created further from an interactive surface, for example from 4 cm to 20 cm of the interactive surface, or up to multiple metres away from the interactive surface. The tactile sensations may be provided such that a user can experience the first and second tactile sensations whilst still being able to see visual information being displayed on the screen. The plurality of acoustic transducers may be provided on one side of an interactive screen and the tactile sensation provided on the other side of the interactive screen. The acoustic transducers may transmit pressure patterns through the interactive screen. The method may comprise providing an object detection or tracking device. The object detection device may, for example, detect the presence of a user's hand in front of a light switch and provide tactile feedback to indicate the light is being turned on, or that the light is being dimmed. The method may comprise tracking a user's hand during interaction with an interactive screen and modifying the pressure patterns transmitted by the plurality of acoustic transducers in response to the movement of the user's hand.

A system for providing tactile sensations comprising: a plurality of acoustic transducers arranged to generate a predetermined distribution of pressure patterns, wherein the pressure patterns comprise a first region providing a first tactile sensation and a second region providing a second, different, tactile sensation.

The plurality of acoustic transducers may be arranged in a 2D array. The plurality of transducers may be arranged in a 3D array.

The system may further comprise an interactive surface, for example an interactive screen. The pressure patterns generated by the plurality of acoustic transducers may be associated with visual information displayed on the interactive screen.

The system may include a tracking device. The tracking device may be arranged to track the movement of an object, for example part of a user, for example a hand. The output of the interactive screen may be changed in dependence on movement detected by the tracking device. The pressure patterns generated by the plurality of acoustic transducers may be changed in dependence on the output of the interactive screen. Such a system may, for example, provide a control device for a music player. The interactive screen may display a play/pause control and a volume control for the music player. The play/pause control may be associated with the first region. The volume control may be associated with the second region. A user is able to distinguish between the play/pause control region and the volume control region by the different tactile sensations experienced at each region. The tracker device may detect movement of a user's hand in the play/pause control region and provide control information to the music player accordingly. For example, a gesture such as "tapping" in the play/pause region may result in the music player playing or pausing musical output. The tracker device may detect movement of a user's hand in the volume control region and provide control information to the music player accordingly. For example, a gesture such as "sliding" in the volume control region may result in the volume of the musical output of the music player being increased or decreased. By providing different tactile sensations, the system allows a user to accurately place their hand or hands in the appropriate position for providing input to the interactive screen. The system may be arranged to provide feedback to a user when the user's hands are located in the correct position to interact with the system. For example, when a user's finger is located in the play/pause control region or volume control region, a vibration may be transmitted. Alternatively the perceived strength or intensity of the feedback may be increased. Tactile feedback may be provided when the control gestures are completed and registered by the system.

In an alternative embodiment, the interactive screen may display mapping data. The pressure patterns created by the plurality of acoustic transducers may represent an additional layer of data related to the data shown on the interactive screen. For example, population data may be represented by different tactile sensations. Alternatively or additionally, the land type may be represented by different tactile sensations, for example the first tactile sensation representing land and the second, different, tactile sensation representing water.

In an alternative arrangement, the system may comprise a floor mat. The floor mat may be arranged to be walked over by a user. The first region and second region may be used to provide different tactile sensations to a user walking over the floor mat. For example, the first region may provide a tactile sensation similar to that of walking through water. The second region may provide a tactile sensation similar to that of walking through sand. Such a system may be used to provide a virtual environment in a setting such as a theme park.

It will of course be appreciated that features described in relation to one aspect of the subject matter described herein may be incorporated into other aspects of the subject matter. For example, the method of the subject matter may incorporate any of the features described with reference to the apparatus of the subject matter and vice versa.

DESCRIPTION OF THE DRAWINGS

Embodiments described herein will now be described by way of example only with reference to the accompanying schematic drawings of which.

DETAILED DESCRIPTION

Figure 1:
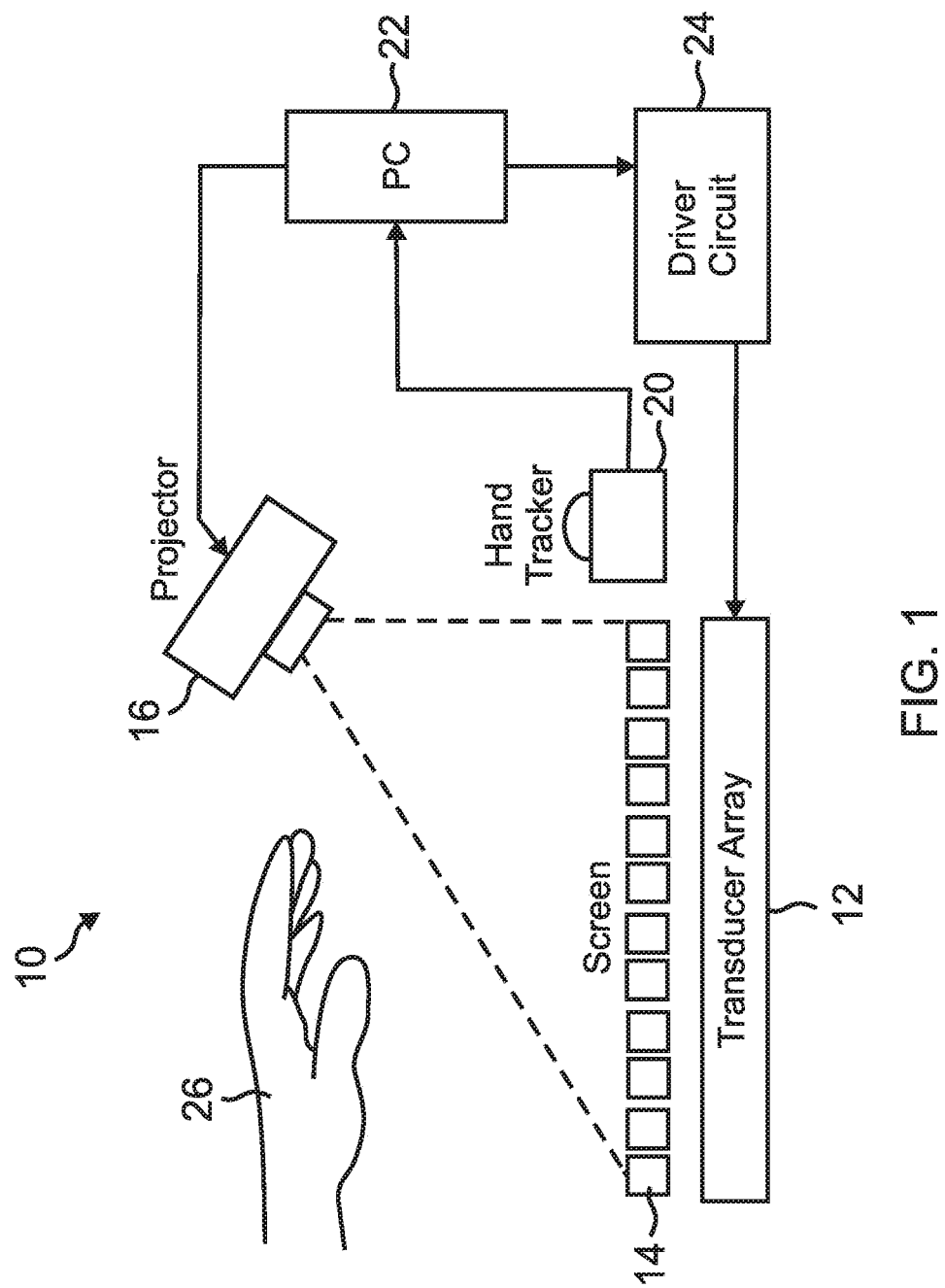
FIG. 1 shows a schematic view of a tactile feedback system according to a first embodiment.

FIG. 1 shows a system 10 comprising a transducer array 12, a screen 14, a projector 16, a hand tracker 20, a PC 22, a driver circuit 24, and a user's hand 26. The transducer array 12 is located underneath the screen 14 and arranged such that pressure patterns may be transmitted through the screen 14 to a region above the screen 14. In this particular embodiment, the transducer array comprises 320 muRata MA40S4S transducers arranged in a 16×20 grid formation. Each transducer unit is 10 mm in diameter and the transducers are positioned with no gap between them in order to minimise the transducer array 12 footprint. The transducers produce a large amount of sound pressure (20 Pascals of pressure at a distance of 30 cm) and have a wide angle of directivity (60 degrees). The transducers are arranged to transmit ultrasound waves at a frequency of 40 kHz. The projector 16 is arranged to project visual information onto the screen 14 from above the screen 14 as shown. In an alternative embodiment, the projector may be placed between the transducer array and the screen, with the projection coming from below the screen.

A user interacts with this visual information and the movement and position of the user's hand 26 is tracked by the hand tracker 20. In this particular embodiment, the hand tracker 20 is a Leap Motion controller arranged to provide the 3D coordinates of the user's fingertips and palm at up to 200 frames per second. The system 10 is controlled by a PC 22, which sends control data to the projector 16, receives user data from the hand tracker 20, and controls the driver circuit 24 for driving the transducer array 12. The PC 22 controls the drive unit 24 such that a pressure pattern is created in the region above the transducer array 12. In response to the hand movements of a user, the PC 22 may drive the drive controller 24 to cause the transducer array 12 to change the pressure pattern formed above the transducer array 12.

In order to compute the amplitude and phase of the acoustic wave each acoustic transducer must transmit for the desired pressure pattern to be created. An algorithm adapted from that proposed by Gavrilov may be used, as set out in more detail below. A volumetric box is defined above the transducer array 12. Within the box, a plurality of control points are defined. The control points may represent points where a maximum pressure value is desired, or points where minimum pressure values are desired. The pressure values are maximised or minimised by maximising or minimising the intensity of the ultrasound emitted by the transducer array 12 which is incident at the control points.

An algorithm is used to model the outputs of each of the transducers in the transducer array 12 required to obtain each of the desired pressure patterns which may be created within the volume defined above the transducer array 12. The algorithm may be split into three steps.

Firstly, the acoustic field generated by a single transducer is calculated to create a large modelled volume. Thereby, the phase and amplitude at any point within the modelled volume may be determined by offsetting the sample transducer for the position, phase, and amplitude, of each of the transducers in the real transducer array, and combining these values.

Secondly, the control points are defined in the 3D volume above the transducer array such that the control points take on the required distribution. The control points may be points of maximum intensity or minimum intensity (also known as null points). In addition to a 3D location, the desired modulation frequency of the maximum control points may be specified. Therefore, a first control point may be defined with a first modulation frequency, and second control point may be defined with a second, different, modulation frequency.

Thirdly, the optimal phases are calculated using a minimum norm solver so that the resulting acoustic field is as close as possible to that specified by the control points. There may be more than one solution that will create an optimal focusing to the control points, but some solutions create a higher intensity than others. Solutions are therefore iteratively generated to find the one that creates the highest intensity.

Figure 3:
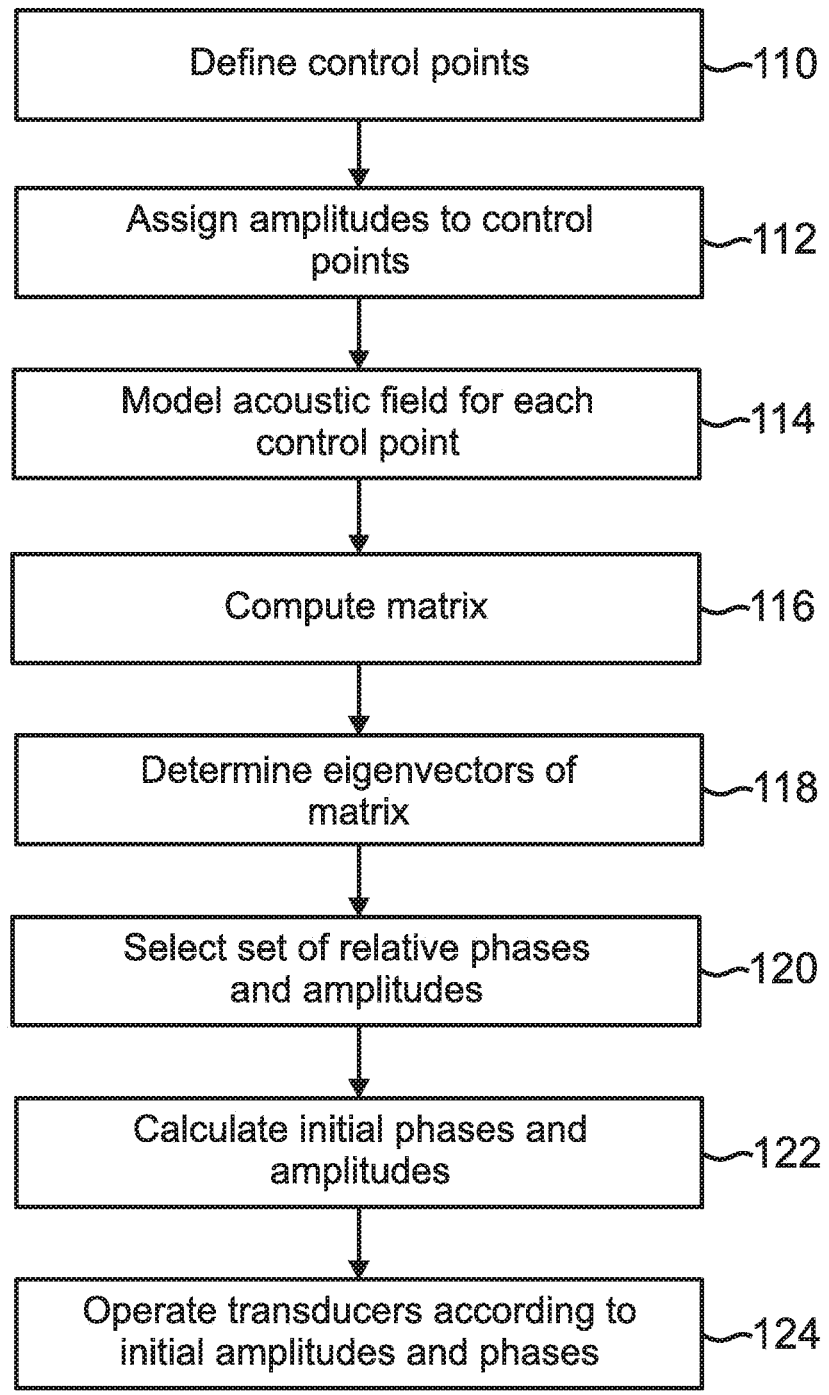
FIG. 3 shows a flow diagram of calculations undertaken by a tactile feedback system.

FIG. 3 shows a flow chart schematically representing an example method of producing an acoustic field. The method begins at step 110, in which a plurality of control points are defined. A control point is a point positioned in a space through which the acoustic field may propagate, at which the amplitude or phase of the acoustic field is to be controlled. A control point is a marker at a particular location. The distance between adjacent control points should be sufficient to enable the phase of the sound waves of the acoustic field to shift from one of the control points to match the next control point. In some embodiments the separation distance may be equal to the wavelength of the sound waves of the acoustic field, for example a separation of 8.5 mm for a 40 kHz carrier wave. In some embodiments, the separation distance may be equal to half the wavelength of the sound waves of the acoustic field. In some embodiments the separation may be greater than the wavelength of the sound waves of the acoustic field. The skilled person will appreciate that other suitable separation distances could be used.

The array of transducers 12 is arranged to produce the acoustic field. The positions of the control points relative to the array of transducers 12 is determined. The use of control points to control an acoustic field is known from a paper entitled "The possibility of generating focal regions of complex configurations in application to the problems of stimulation of human receptor structures by focused ultrasound", L. R. Gavrilov, 2008, Acoustical Physics Volume 54, Issue 2, pp 269-278, Print ISSN 1063-7710.

In the embodiment described herein, the acoustic field is produced in air. However, in alternative embodiments the acoustic field may be produced in another medium through which sound waves can pass, such as water.

At step 112 amplitudes are assigned to the control points. The assigned amplitudes represent target amplitudes of the acoustic field at the control points, which form a basis for modelling the acoustic field. The control points are assigned by a user; however, in other embodiments, the control points may be assigned by an automated process.

At step 114, an acoustic field is modelled for each control point. According to this embodiment, modelling the acoustic field at a control point comprises modelling the acoustic field produced by a virtual transducer directly below the control point in the plane of the real transducer array, the initial amplitude and phase of the virtual transducer being modelled such that the modelled acoustic field has the assigned amplitude at the control point. However, in some embodiments, alternative ways of modelling the acoustic field may be used, for example, different arrangements of virtual transducers may be used, that is one or more virtual transducers may be positioned directly below the control point or may have a different spatial relationship to the control point to produce the modelled acoustic field. In this embodiment, step 114 comprises modelling the acoustic field separately for each control point.

At step 116, a matrix is computed which contains elements which represent, for each of the control points, the effect that producing the modelled acoustic field of step 114 having the assigned amplitude of step 12 with a particular phase at the control point has on the consequential amplitude and phase of the modelled acoustic field at the other control points. In the first embodiment, the matrix computed at step 116 is an N×N matrix where N equals the number of control points although other suitable forms of matrix will be apparent.

At step 118, eigenvectors of the matrix are determined. In the first embodiment step 118 comprises determining right eigenvectors of the matrix, each eigenvector representing a set of phases and relative amplitudes of the modelled acoustic field at the control points.

At step 120, a set of relative phases and amplitudes is selected by selecting one of the eigenvectors determined in step 118.

At step 122, initial phases and amplitudes to be output by the individual transducers of the array of transducers are calculated. The initial phases and amplitudes are calculated such that they produce a resultant acoustic field with phases and amplitudes that correspond to the phases and relative amplitudes of the selected set. In embodiments of the subject matter described herein the term "correspond" may be used to mean that the phases and amplitudes of the resultant acoustic field at the control points will be substantially equal to the phases and relative amplitudes of the selected set, taking into account any errors that may be introduced as part of a regularisation step. Thus, the algorithm according to embodiments of the subject matter described herein may compute the phase delay and amplitude for the transducers in the array that will create an acoustic field that best matches the assigned amplitudes of the control points.

At step 124, the transducers of the transducer array are operated such that the transducer array outputs acoustic waves having the initial amplitudes and phases which were calculated in step 122. In some embodiments, the transducers may be operated to continue to output one or more acoustic waves. In some embodiments, the control points may be re-defined and the method may repeat with a different set of control points. In some embodiments, the method may include the step of calculating eigenvalues of the matrix. The eigenvalues represent scaling factors, some of which will be relatively high and some of which will be relatively low, in relation to each other. In some embodiments, the method may comprise selecting a set of phases and relative amplitudes with a relatively high corresponding eigenvalue as the selected set. In some embodiments, the method may comprise selecting the set of phases and relative amplitudes with the highest corresponding eigenvalue as the selected set. The eigenvalues define how the corresponding eigenvectors scale when they are transformed by the matrix. That is, the eigenvalues represent how much the relative amplitudes of the acoustic field at the control points will scale up once the indirect contributions to the amplitude at each control point caused by producing an assigned amplitude at the other control points is taken into account. Therefore, finding a large eigenvalue indicates a corresponding set of relative amplitudes and phases that make use of a large amount of constructive interference. Choosing a set of relative amplitudes and phases with a corresponding eigenvalue which is relatively high, taking into account the relative values of all the eigenvalues of the matrix, has an advantage over choosing a relatively low eigenvalue, as it makes more efficient use of the power output by the transducers. In some embodiments, the method may include computing the effect of producing the assigned amplitude at one of the control points on the amplitude and phases at each of the other control points using a look-up function which defines how the amplitude and phase of the acoustic waves vary spatially due to attenuation and propagation. In some embodiments in which a look-up function is used, the spatial variation of the phase of the sound waves due to attenuation and propagation is computed once for a particular transducer array, which decreases the time needed to model the acoustic field and the time needed to calculate the initial amplitude and phases of the transducers that will produce the phases and amplitudes of the resultant acoustic field. In some embodiments, the method may include a regularisation step in which errors are introduced into the initial amplitude and phase output by the transducers. The advantage of including a regularisation step is that this can improve the power output efficiency of the array by increasing the average amplitude of the transducers so that more of them are on at a higher amplitude. For example, to avoid a situation where one transducer is on at 100% and all of the others are on at 0.1%, the regularisation step introduces some errors in return for the average amplitude of the transducers being raised to, say, 80%.

In some embodiments, the regularisation technique may be a weighted Tikhonov regularisation. The advantage of using a weighted Tikhonov regularisation is that it has an easily specified matrix augmentation. In some embodiments, the power output by the transducer array may be scaled such that the transducer outputting the highest of the initial amplitudes operates at substantially full power. Scaling the power output in this way has an advantage in that it results in the power output of the transducer array being as high as possible for a given set of initial amplitudes, whilst maintaining the levels of the initial amplitudes, relative to each other. In some embodiments, the acoustic waves may be modulated at a frequency between 0 Hz and half of the carrier frequency; in some embodiments the carrier frequency is 40 kHz. In some embodiments the acoustic waves may be modulated at a frequency between 0.1 Hz to 500 Hz, and in some cases between 150 Hz and 250 Hz. Modulating the acoustic waves at a frequency between 0.1 Hz to 500 Hz gives rise to an advantage of increasing the suitability of the method for use in haptic feedback applications, since tactile receptors in human skin are most sensitive to changes in skin deformation at these frequencies. In some embodiments, the positions of the control points may be chosen to define parts of a virtual three-dimensional shape which occupies a volume in the acoustic field. In some embodiments, the control points may lie on the edges of the shape or adjacent to the edges of the shape. In some embodiments, the control points may lie within the volume of the shape. In some embodiments, the control points may define the whole of the shape. In some embodiments the control points may define part of the shape. In some embodiments, the control points may define a shape to be felt by a user as part of a haptic feedback system of which only the part of the shape with which the user is interacting may need to be defined. In some embodiments, the control points may be divided into a first group of control points at which the acoustic field has a relatively high amplitude and a second group of control points at which the acoustic field has a relatively low amplitude in comparison with the high amplitude. The control points' amplitude may be between the maximum and minimum; for example, some control points may be at half amplitude. Some applications may have a wide distribution of amplitudes throughout the control points; for example, in order to vary the intensity of haptic feedback across a region. In some embodiments, the edges of a virtual shape may be defined by the first group of control points. The control points in the second group may each be arranged so as to be adjacent to a control point of the first group, such that a gradient in amplitude of the acoustic field is produced at the edge of a virtual shape. Providing a group of control points at which the acoustic field has a relatively high amplitude and a group of control points at which the acoustic field has a relatively low amplitude to provide a gradient in amplitude of the acoustic field at the edge of a virtual shape provides an advantage in haptic feedback applications since it produces a more detectable difference in amplitude of the acoustic field, rendering the edge of the virtual shape more easily detectable by a user. At least some of the control points may be positioned at points where an object intersects with a virtual shape. At least some of the control points may be positioned adjacent to the points of intersection. Positioning control points in the region of points where an object such as a user's hand intersects a virtual shape provides the advantage that the acoustic field only needs to be controlled at points on the virtual shape with which the object is interacting, which enables higher amplitudes to be produced at those control points. The points where the object intersects with the virtual shape may be monitored in real time by an object tracker, and control points may be positioned at different points in the acoustic field in response to the object position. In some embodiments, the number of control points may be at least 10 and preferably at least 50. A higher number of control points enables the produced acoustic field to have more points at which the amplitude can be controlled. This feature enables, for example, larger or more complicated 3-dimensional or 2-dimensional virtual shapes to be defined, or where only part of a virtual shape is being defined, more detail may be represented on that part of the shape.

The control points are defined in 3D, and may lie in different planes. The control points may be positioned to create multiple high intensity points (control points) at different heights with respect to the transducer array. Such control points may be utilised for example to represent different points of user interaction or different information values. In order to avoid having secondary maxima at unwanted points, null control points may be utilised. A null control point acts in the opposite way to a control point, and instruct the algorithm to generate zero amplitude at that point.

The human hand is not capable of detecting vibrations at 40 kHz. Therefore, the ultrasound transmissions of the transducers are modulated in order to create vibrations that are detectable by the human hand. The optimum range for human detection is between 0.1 Hz to 500 Hz.

Figure 2:
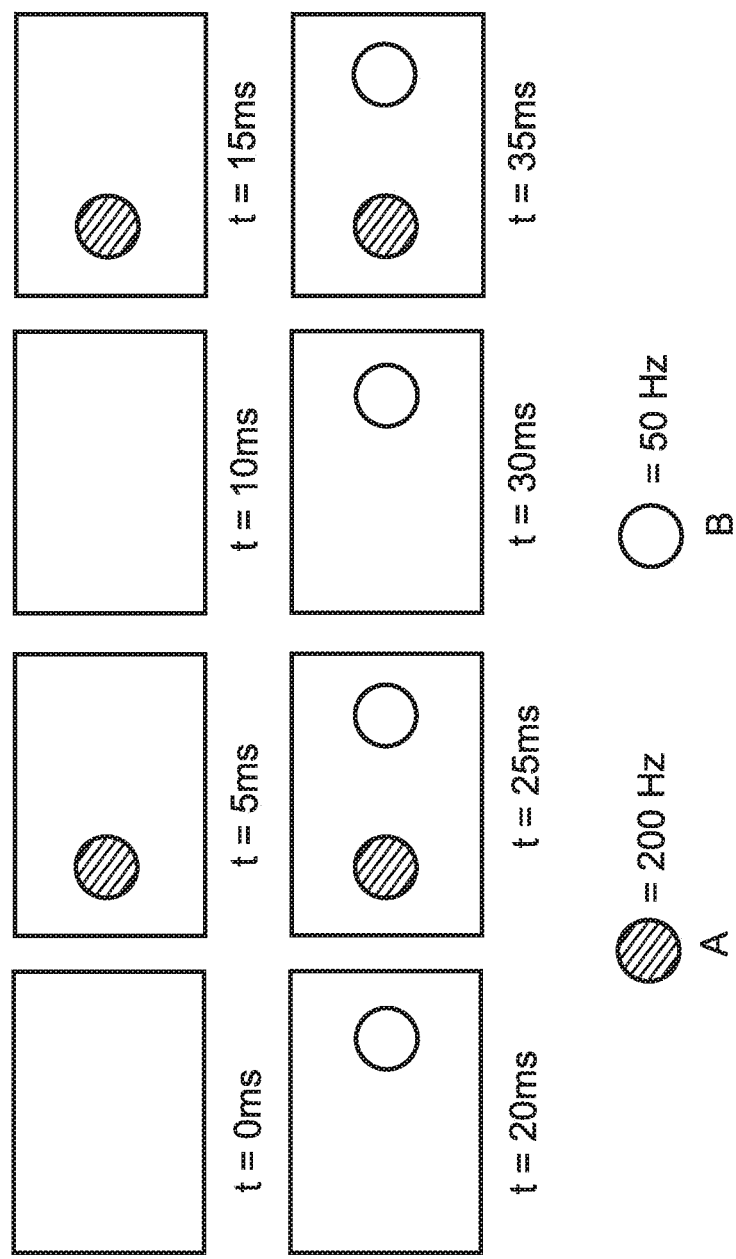
FIG. 2 shows how pressure patterns may be multiplexed to provide different tactile sensations.

In example embodiments, modulating multiple focal points at different frequencies is achieved by time multiplexing scenes with different numbers of focal points. FIG. 2 shows a pressure pattern including two focal points, A (dark circle) and B (light circle), each focal point being a maximum intensity focal point. Focal point A is modulated at 200 Hz and focal point B is modulated at 50 Hz. The different modulation frequencies of focal point A and focal point B means a different tactile sensation will be experienced at each focal point. Four scenes are generated by the transducer array 12, one empty scene with no focal points, one scene with only focal point A, one scene with only focal point B, and one scene with both focal points A and B. The scenes are then moved between as illustrated in FIG. 2. Firstly, at t=0 ms, no focal points are generated, at t=5 ms, focal point A is generated, at t=10 ms, no focal points are generated, at t=15 ms, focal point A is generated, at t=20 ms, focal point B is generated, at t=25 ms focal points A and B are generated, at t=30 ms, focal point B is generated, at t=35 ms, focal points A and B are generated, and the sequence is repeated. As can be seen in the figure, focal point A is being modulated at a frequency of 200 Hz (on/off every 5 ms) and focal point B is being modulated at a frequency of 50 Hz (on/off every 20 ms). The amplitude of a single focal point is greater than the amplitude of one of a pair of focal points. Therefore, after calculating the phases and amplitudes for each scene, the amplitudes of the transducers is scaled such that the amplitudes of the focal points remains constant.

In order to reduce the attenuation of the ultrasound as it passes through the screen 14, it is preferred that an acoustically transparent material is used to make the screen. Preferably the screen material is perforated in order to reduce the attenuation of ultrasound as it is transmitted through the screen.

In order to maximise the amplitude of multiple focal points, a distance that is a multiple of the wavelength of the ultrasound should separate the focal points. This allows individual sound waves to contribute constructively to each focal point.

The method and system for providing tactile sensations may be used in a number of different technologies. Such technologies include, but are not limited to the following.

The method and system for providing tactile sensations can be used with interactive displays, where mid-air gestures allow a user to interact with the display. With the subject matter described herein, individual feedback can be targeted to each finger of a user, thereby giving a greater sense of control and enabling the use of more reserved and precise motions to provide commands to the display. The provision of different tactile sensations also allows a user to easily locate different feedback regions of an interactive device.

The method and system for providing tactile sensations may be used to supply a layer of non-visual information above a screen. Being able to provide the tactile sensations a distance away from a screen allows a user to receive both visual and tactile information simultaneously. As an example, when browsing a map, population data may be projected as a heat map into the air above the screen.

The method and system for providing tactile sensations may also be used to guide and provide information to a user when a screen is not visible to them, for example if the user is driving. The method and system for providing tactile sensations may be used to guide the user to the location of an interactive element, for example a volume slider on a music player. Feedback providing different sensations could guide a user to different elements of a music player, for example providing a strong focal point above the main controls of a music player, and a weaker feedback being provided above the volume slider. Alternatively, the different feedback points may have different tactile sensations when experienced by a user.

The method and system may be used in a virtual reality gaming environment to provide tactile feedback to one or more players of a game.

Whilst the subject matter described herein has been described and illustrated with reference to particular embodiments, it will be appreciated by those of ordinary skill in the art that the subject matter described herein lends itself to many different variations not specifically illustrated herein. By way of example only, certain possible variations will now be described.

For example, ultrasound may be transmitted through an array of buttons rather than a screen. An embodiment may comprise a keyboard with tactile feedback being provided in the space above the keys, or a remote control device, so that information can be provided by waving a hand above the device. In an alternative embodiment, the tactile feedback system may be integrated in the neck-rest of a car seat, to provide a user with tactile information on the neck corresponding to navigational cues such as turn left or turn right. In such an arrangement, tactile feedback may be provided to indicate the presence of another vehicle or object in proximity to a vehicle which the driver may not be able to see.

Where in the foregoing description, integers or elements are mentioned which have known, obvious or foreseeable equivalents, then such equivalents are herein incorporated as if individually set forth. Reference should be made to the claims for determining the true scope of the present inventions, which should be construed so as to encompass any such equivalents. It will also be appreciated by the reader that integers or features of the subject matter that are described as preferable, advantageous, convenient or the like are optional and do not limit the scope of the independent claims. Moreover, it is to be understood that such optional integers or features, whilst of possible benefit in some embodiments of the subject matter, may not be desirable, and may therefore be absent, in other embodiments.

The invention claimed is:

1. A method of generating a tactile sensation comprising the steps of:
   providing a plurality of ultrasonic transducers arranged to generate a predetermined distribution of non-surface pressure patterns in mid-air using an ultrasonic carrier frequency modulated at a frequency that is detectable by a human hand;

wherein the pressure patterns comprise a first non-surface region comprising a focal point for a plurality of acoustic waves modulated at a first frequency providing a first tactile mid-air sensation on the human hand, and a second non-surface region comprising a focal point for a plurality of acoustic waves modulated at a second frequency providing a second tactile mid-air sensation on the human hand;

tracking a location of the human hand by a tracking device;

wherein the first frequency is different than the second frequency;

wherein the first tactile mid-air sensation is different than the second tactile mid-air sensation;

wherein the pressure patterns are created using a modeling algorithm having three steps, wherein the first step of the modeling algorithm comprises calculating an acoustic field for a selected transducer within the plurality of ultrasound transducers to create a modeled volume;

wherein the second step of the modeling algorithm comprises defining a plurality of control points within the modeled volume to create a first modeled acoustic field; and wherein the third step of the modeling algorithm comprises creating a second modeled acoustic field by calculating optimal phases using a minimum norm solver so that the second modeled acoustic field is close to the first modeled acoustic field.

2. The method as in claim 1, further comprising a gradient in amplitude within the acoustic field to simulate an edge of a virtual shape.

3. The method as in claim 1, wherein one of the plurality of control points is a point of maximum intensity.

4. The method as in claim 1, wherein one of the plurality of control points is a null point.

5. The method as in claim 1, wherein a first of the plurality of control points is defined with a first modulation frequency and a second of the plurality of control points is defined with a second modulation frequency.

6. The method as in claim 1, wherein the third step further comprises calculating a plurality of iterative optimal phases to determine the highest intensity for the plurality of control points.

7. The method as in claim 1, wherein the plurality of control points are assigned by a user.

8. The method as in claim 1, wherein the plurality of control points are assigned by an automated process.

* * * * *